United States Patent [19]
DeCaro et al.

[11] Patent Number: 5,508,836
[45] Date of Patent: Apr. 16, 1996

[54] INFRARED WIRELESS COMMUNICATION BETWEEN ELECTRONIC SYSTEM COMPONENTS

[75] Inventors: Robert DeCaro, San Juan Capistrano; Christ H. Saunders, Laguna Niguel; Dale Maeding, Dana Point, all of Calif.

[73] Assignee: Irvine Sensors Corporation, Costa Mesa, Calif.

[21] Appl. No.: 305,066

[22] Filed: Sep. 13, 1994

[51] Int. Cl.$^6$ .......................... H04B 10/06; H04B 10/00
[52] U.S. Cl. .......................... 359/189; 359/172; 359/142
[58] Field of Search .................... 359/142, 143, 359/171, 172, 189, 194; 455/343, 127; 375/75

[56] References Cited

U.S. PATENT DOCUMENTS

| | | | |
|---|---|---|---|
| 4,545,076 | 10/1985 | Biard et al. | 359/194 |
| 4,754,133 | 6/1988 | Bleich | 359/113 |
| 5,155,353 | 10/1992 | Pahr | 250/214 R |
| 5,155,614 | 10/1992 | Carmen et al. | 359/189 |
| 5,202,553 | 4/1993 | Geller | 359/189 |
| 5,216,238 | 6/1993 | Yoshioka et al. | 359/189 |

*Primary Examiner*—Leo Boudreau
*Assistant Examiner*—Bhavesh Mehta
*Attorney, Agent, or Firm*—Thomas J. Plante

[57] ABSTRACT

A wireless infrared pulse-transmitting system for communication with electronic components. The receiver for such a system has radically reduced current (and power) values, which permit a battery-powered receiver to remain on while awaiting transmitter signals. Use of several mosfet transistors operating in the subthreshold region minimizes power. Bandwidth requirements are met, in spite of the low power operation. In order to eliminate amplifier saturation, with the accompanying problem of recovery time which slows the transmission process, clamping circuitry is used to cause instantaneous shunting of signals when a predetermined signal level is reached.

12 Claims, 8 Drawing Sheets

INFRARED WIRELESS COMMUNICATION BETWEEN ELECTRONIC SYSTEM COMPONENTS

BACKGROUND OF THE INVENTION

This invention relates to two-way wireless communication using infrared radiation as a transmission medium. It may be used in electronic systems for interaction between computers, peripherals, and serial communication ports, where relatively short distance information exchanges are needed. The information is conveyed by infrared (IR) pulses. The primary interest is in serial IR (SIR) communication, but parallel IR is also feasible.

The use of infrared communications channels allows for short range, point-to-point data transfer and communications. Palmtop and laptop computers, in particular, will benefit from the ability to communicate without increasing system size, weight and, most importantly, power dissipation. Moreover, the use of wireless IR eliminates the need for bulky connectors. Wireless IR also has potential in many other applications, including information consumer apparatus, e.g., cellular phones, pagers and watches, remote unit data down-load, computer tablets, barcode readers, wireless LANs, data logging equipment, and more. Wireless IR has a potential application in any data transfer application where mechanical connector interface is impractical.

Recent developments have introduced such wireless communication systems, initially as a means of enhancing computer system portability. The infrared Data Association (IrDA) has pioneered standards for short-range, point-to-point communications. Narrow-field infrared is considered desirable for such communications. Each component in the communications network has a transmitter and a receiver.

The following relevant information is copied from an article in *Electronic Engineering Times* (Feb. 21, 1994):

> The user model is a walk-up, point-to-point connection model. It involves making a conscious connection between the mobile and the fixed assets in the work environment, including desktop computers, printers, systemizers, modems, and, later, telephones.
>
> Depending on the system maker, the operating range varies between either 0 to 1 or 0 to 3 meters. The number zero is actually a system driver, because makers of the earliest systems using serial IR found that users, when they aren't getting the kind of response they want, tend to put the diodes right next to each other. This fact stresses the dynamic-range requirement in the analog portion of the receiver. The 1- or 3-meter numbers relate to what different company focus groups have found that users want. These groups have also found that a 30° cone (the angular relationship between the transmitter and receiver) is sufficient for doing serial IR.
>
> IrDA members have already agreed on a number of key technical parameters. First, the maximum baud rate to be supported is 115.2 kbits/second. This is also the maximum baud rate for high speed PC serial ports.
>
> IrDA has decided to leave open the possibility of moving to 1 Mbit/s in the future. Such a jump requires a change in the wavelength of IrDA-compliant devices to 880 nm from 950 nm used in existing devices. Yet, most 880-nm devices still will be able to converse with 950-nm devices. Beyond this, serial IR operates in half-duplex and assumes an asynchronous charter-based universal asynchronous receiver/transmitter (UART) interface. To minimize power, the transmitter time is either $3/16$ of the bit rate, or 1.6 microseconds.
>
> In the hardware portion of the serial IR approach, the link data comes from a UART. The format transmitter takes this data and translates it to a $3/16$ pulse that is $3/16$ of the bit time, or 1.6 microseconds. In other words, the format transmitter limits the duty cycle on the light pulse via the interaction of the shift register and the flip/flop. Specifically, the shift register outputs $1/16$ the data and the flip/flop runs it out to $3/16$ before closing off. Following this step, a GaAlAs LED translates the "data" current into "data" photons.
>
> On the receiving side, a lensed photodiode detector receives the "data" photons from the transmitter and translates it back into "data" current. The recovered current is amplified, digitized, and input to a format decoder to stretch the data back to the full bit time.
>
> Key trade-offs concern range vs. power, and power consumption vs. battery life, especially if the system needs a sleep mode. Accomplishing any of these allows increased receiver sensitivity and reduced transmitter power. The move to 3 meters alone requires a tenfold increase in power if the receiver system sensitivity does not increase. The best solutions will need to be able to take advantage, where possible, of low-power operation, especially because many PDAs are planning to operate on AA or AAA batteries.
>
> Regardless of the implementation, one issue is clear: The complete hardware system must be inexpensive. Many systems makers have already indicated their target cost for all elements of a system is less than $5.

The foregoing quotation identifies several problems in providing a satisfactory wireless IR system:

(1) A wide dynamic range is necessary because of the variations in distance between transmitter and receiver.

(2) High speed signal transmission is required, and delays within and between transmissions must be minimized.

(3) The intention to use batteries calls for significant conservation of power.

Experience has shown that it is very difficult to provide a receiver which satisfies the desires of potential users, as outlined in the quoted material. In fact, it appears that no satisfactorily workable SIR receiver has been developed prior to the present invention.

SUMMARY OF THE INVENTION

The present invention deals successfully with the challenges identified by IrDA. But it also provides insights and solutions going beyond the IrDA analysis.

An important need from a practical standpoint is to provide a receiver which is ready to receive signals at all times, i.e., which is "on" in what might be termed an "idling" mode. The practical advantage is that the transmitter isn't required to communicate with the receiver to turn it on before transmitting. This need, combined with the planned use of relatively low power batteries, necessitates drastic power reduction in the receiver. It appears that this issue has not been recognized prior to this invention.

Another important need, which apparently has not previously been perceived, is the elimination of "down" time in the system due to saturation of the receiver input. At least two sources of such saturation exist.

A major, and perhaps primary, saturation problem in serial IR devices is due to the wide dynamic range necessitated by frequent variations in the distance between transmitter and receiver. The signal strength at the receiver will vary by at least an order of magnitude as distance from the transmitter is varied.

Another cause of saturation is the proximity to the receiver of the transmitter which is included in the same package, i.e., the transmitter which sends response signals to the other unit involved in the wireless communication. With a receiver and transmitter mounted side-by-side, any signal sent from the transmitter will cause a delay before the receiver can function, unless the saturation problem is solved.

In dealing with the battery-life problem, the present invention provides a receiver for a wireless two-way connection which reduces the required power by an order of magnitude (or more) compared to receivers previously developed. At the same time, size, cost, and noise are minimized.

In order to attain very low power in the receiver operation, the circuitry uses mosfet transmitters operating in the sub-threshold (weak inversion) region. Such sub-threshold transistor operation is combined with other transistors operating in strong inversion, where such higher power operation is necessary.

The use of sub-threshold amplification, because it requires low input current values, is associated with high impedance values, which in turn tend to increase noise problems and cross-talk problems. Also adequate bandwidth must be maintained. The present invention provides solutions for these problems, based on extensive research and testing efforts.

In dealing with the problem caused by possible receiver amplifier saturation, the present invention radically differs from prior devices, in which downtime has generally been about ten milliseconds. In other words, saturation, for any reason, would cause a 10 ms delay before subsequent processing of signals. One reason for the long delay has been the conventional use of automatic gain control (AGC) as a saturation-controlling concept at the receiver input amplifier.

The present invention provides novel circuitry, which may be referred to as "clamping" circuitry, which tends to prevent saturation, and eliminate the resulting recovery period. Using the present invention, saturation recovery time has been reduced to a point where no signal transfer delay occurs.

DETAILED DESCRIPTION OF PREFERRED EMBODIMENT

Figure 1:
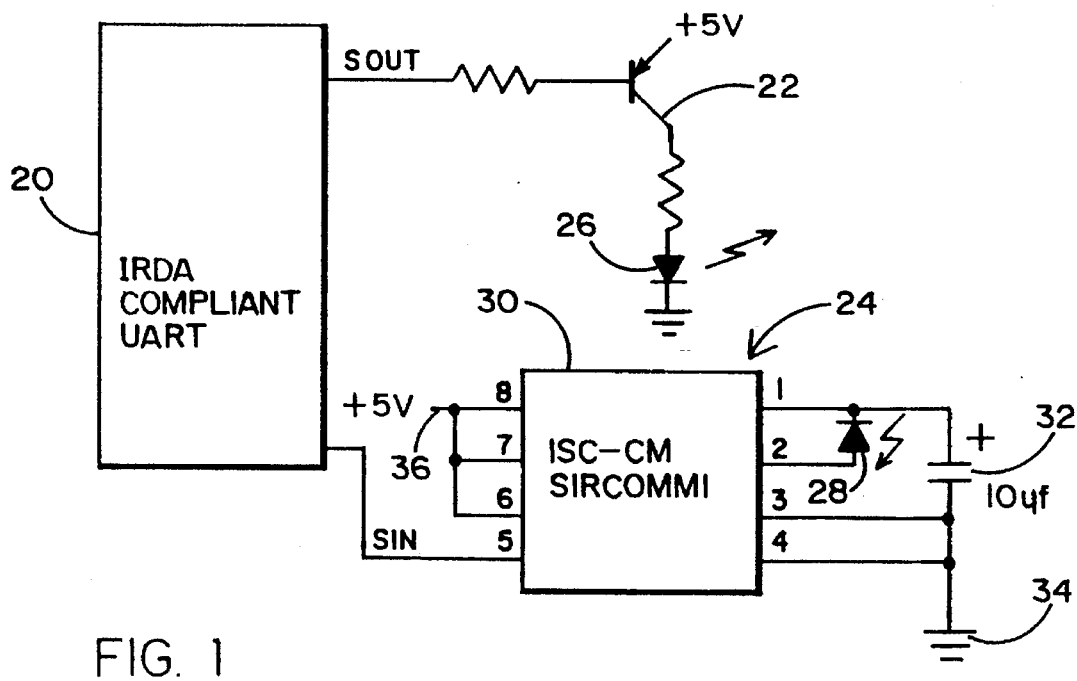
FIG. 1 is a diagrammatic showing of a Serial IR (SIR) operating circuit.

FIG. 1 shows a typical Serial IR operating circuit. Each unit has a universal asynchronous receiver/transmitter (UART) interface 20. It also has a transmitter 22 and a receiver 24. The transmitter 22 will send pulsed signals to the receiver of another UART; and the receiver 24 will receive pulsed signals from the transmitter of another UART. For example, one operating circuit of the type shown in FIG. 1 might be mounted on a portable computer, and another such operating circuit might be mounted on a printer signals can be sent in both directions, but not at the same time.

The present invention is concerned primarily with the receiver circuitry. The transmitter signal may be sent from an LED 26, and received by a photodetector (photodiode) 28. The most critical part of the system is the receiver circuitry represented by block 30. This circuitry is preferably a custom designed integrated circuit (IC) chip, rather than a collection of discrete circuit components.

As shown in FIG. 1, the chip 30 may have eight (or more) connection pins. Pin 1 is connected to the cathode of photodiode 28, and to a capacitor 32 (e.g., 10 µf). Pin 2 is connected to the anode of photodiode 28. Pin 3 is designated Vss analog, and is connected to ground 34. Pin 4 is designated Vss digital, and is connected to ground 34.

Pin 5 is output, and is connected to UART 20 or to receiver format decoder logic. Pin 6 is used to switch between 1 meter operation and 3 meter operation. It is connected at 36 to Vdd for 1 meter operation, and is connected to Vss or is left floating for 3 meter operation. Pin 7 is used to switch between 5 volt and 3 volt operation. It is connected to Vdd for 5V supply and is connected to Vss or is left floating for 3V operation. Pin 8 is connected to the plus terminal of power supply 36.

Figure 2:
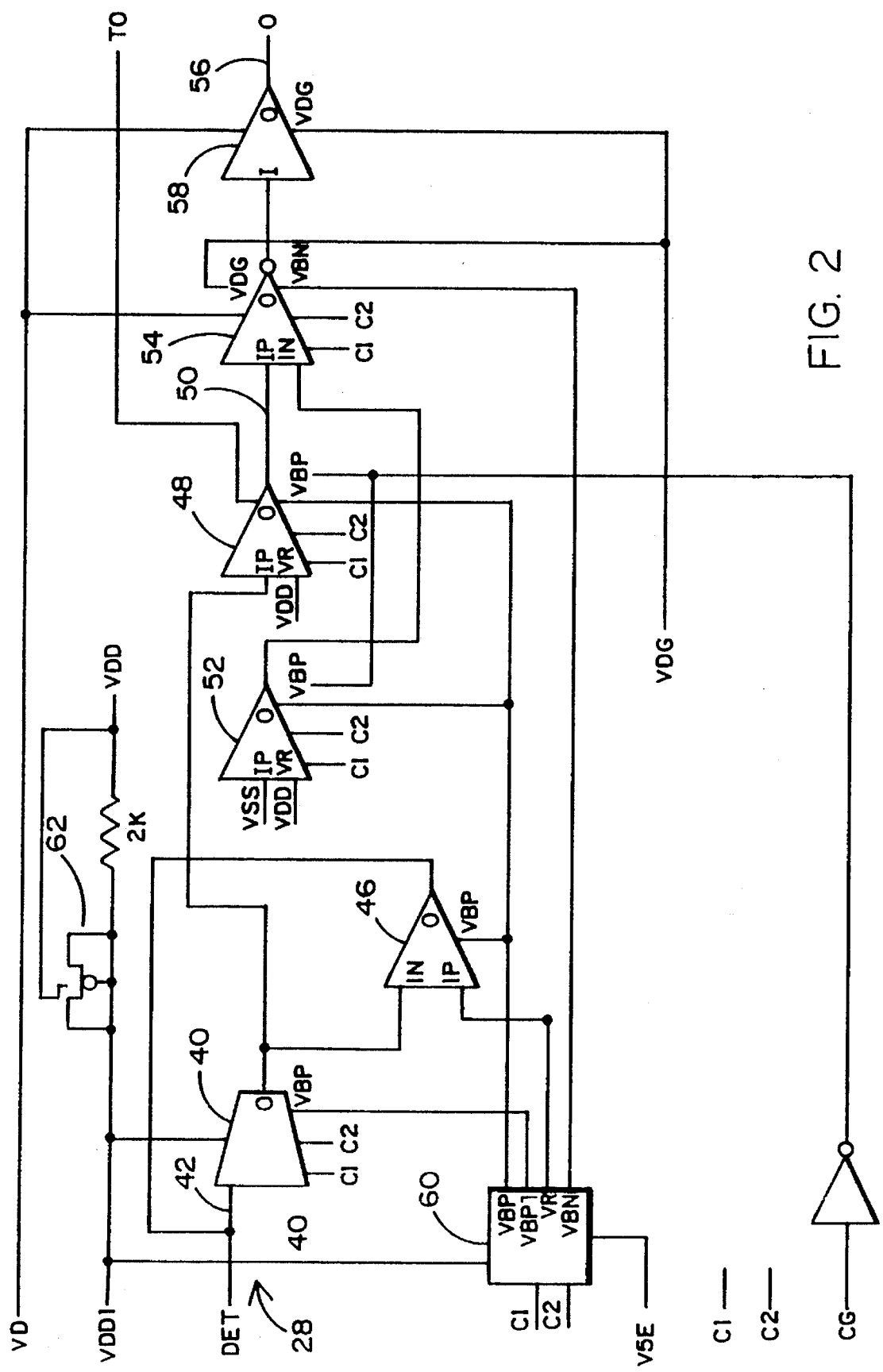
FIG. 2 is a schematic showing diagrammatically the circuitry of the receiver portion of an SIR apparatus.

FIG. 2 is a schematic showing diagrammatically the circuitry of receiver 30, which is preferably incorporated into a single IC chip. The incoming information signals are pulsed, and the eventual receiver output is pulsed. However, the signals require initial stages of amplification in the analog mode, prior to later amplification in the digital mode. The analog mode amplification is important for purposes of range variation, and noise avoidance.

Prior to the present invention, the SIR receiver circuits have generally been provided by combining discrete components, a strategy aimed at cost reduction. The present invention provides completely redesigned receiver circuitry, preferably incorporated into a single IC chip.

As stated above, the present invention has reduced the required receiver power by at least an order of magnitude. It is believed to be the first receiver provided for full time availability, i.e., it is kept "on" at a low quiescent current, removing the need for on-off switching.

Using batteries, particularly small batteries (e.g., size AA or AAA) limits the available power needed to keep the receiver continuously ready for signal inputs. It has been generally established that a quiescent current drain in the neighborhood of 100 microamps (µA) is the maximum power level usable in a receiver-ready SIR. Above that current level, battery life would be too short, or batteries would be too large and heavy, to satisfy user needs.

The present receiver has succeeded in reducing the quiescent receiver-ready current as low as 11 microamps. But this has been accomplished by violating conventional wisdom. This "violation" involves the extensive use of mosfet transistors operating in the sub-threshold (weak inversion) region, as distinguished from the usual strong-inversion region. Strong inversion is referred to as the "square law region". Weak inversion is referred to as the "logarithmic region".

The present invention, for the first time, uses transistors operating in the sub-threshold mosfet region in an SIR receiver. This has required complete and repeated redesign and testing, because of the practical difficulties encountered. Although the availability of sub-threshold operation of mosfets has been known, the prevailing models for mosfet design have been dictated by the digital industry, where low power has not been a major goal. Analog design of mosfet transistors has been neglected.

There are inherent trade-offs involved in sub-threshold mosfet operation. When power is lowered, bandwidth will be lowered, unless voltage is also lowered. Voltage swing is restricted by the use of subthreshold operation. As voltages are lowered, noise becomes a greater problem, because the signal-to-noise ratio is reduced.

The receiver circuitry described below has been designed to meet the low power targets, without creating functional problems in the receiver.

Referring to FIG. 2, pin 2 is the input signal to the receiver circuitry from the IR detector diode 28. Input amplifier 40 is a transimpedance amplifier, which converts the current on line 42 from the detector 28 into a voltage at output 44. Amplifier 40 is designed with a unique circuit configuration that reverse biases the detector diode, and stabilizes the input amplifier with varying detector quiescent current levels. If the detector current exceeds the linear operating range of amplifier 40, a clamp circuit 46 will divert current from input 42 to ground. This preserves the low impedance presented to the detector by amplifier 40, which in turn maintains the amplifier signal bandwidth. The signal is amplified and bandpass filtered by amplifier 48, which outputs at 50.

The incoming signal is a pulsed signal, which doesn't allow an additional AC-coupled stage at the comparator. Therefore, a DC compensation circuit is required to eliminate the effect of output offset of amplifier 48. An amplifier 52 is matched to amplifier 48, so that the DC output voltage of amplifier 52 is equal to that of amplifier 48. This is used as a DC compensation circuit into the following stage. The analog signal from amplifier 48 is converted to digital logic levels by a comparator 54. The digital output from comparator 54 is buffered to an output line 56 by a buffer amplifier 58. Bias circuitry shown at block 60 provides the proper biasing and voltage references to all circuit blocks.

VD and VDG are digital supply voltages. C1 and C2 are trim controls for compensating process variations of well resistance. CG is a gain control. V5E is a supply selection control, which is high for 5 volt operation and low for 3 volt operation. To is a test output. VDD1 is a bypassed supply pin to which a 10 µF capacitor is connected. Transistor 62 is a protection diode.

Low power operation of the receiver circuitry has been achieved by starting with minimal circuit architecture to accomplish the design requirements of detector current amplification, noise rejection, adequate bandwidth, and low quiescent currents. The V5E control used to select supply voltage is unique, in the sense that ICs designed to operated in 3–5 V ranges typically have no supply select line. Deleting this control pin normally would be desirable, because the IC could have a smaller footprint and test time; thus price would be reduced. In this design, however, a select is required to keep biasing of circuits in the low power region when switching from 3 to 5 V operation. No on-chip circuits were added to automatically adjust for supply selection, because these circuits would require current themselves and thereby increase the total chip power.

Another circuit compromise used to achieve low power was the sharing of reference voltage VR (see block 60). This voltage is used to set all circuit current levels in the bias block 60, and also is used to set a clamp level in the clamp block 46. This sharing of a single reference voltage reduces the IC current that would be required if two reference voltages were separately generated, at the expense of the possibility of noise from the clamp circuit 46 corrupting bias currents via parasitic feedback of switching transients when clamping the input. Parasitic feedback of transients to the input of amplifier 40 is of great concern in this high gain amplifier design, and has been avoided only by careful circuit design and physical layout.

Further power-saving design considerations have been made throughout the design, the details of which will be included in the block descriptions below. The transistors in the amplifiers were biased with currents just large enough to have low noise, and high enough gain to meet circuit operation requirements. Special unusual circuit configurations have been used to eliminate bias voltage generators and excessive quiescent currents.

Another unique and significant feature of this circuit is the clamp circuit 46 around the input amplifier 40. The receiver circuitry operates in a half-duplex mode, in which the received signal can be as low as 300nA, followed by the signals in the 3mA range from its own transmitter cross talk when duplexing. The input circuit must recover from large input transients such as these in typical operation, in order to maintain efficient effective data rates. One approach to handling large dynamic range DC operation, which has not been used in this application, would have been Automatic Gain Control (AGC) in the input stage. AGC circuits typically have recovery times in the 10 ms range after detecting large signals. This would result in the requirement of waiting 10 ms after transmitting, before a low level signal could be detected, thereby reducing the available transmit duty cycle and effective data rate. The different approach taken has been use of a clamping circuit that has a fast recovery time, whose details are described below.

Figure 3:
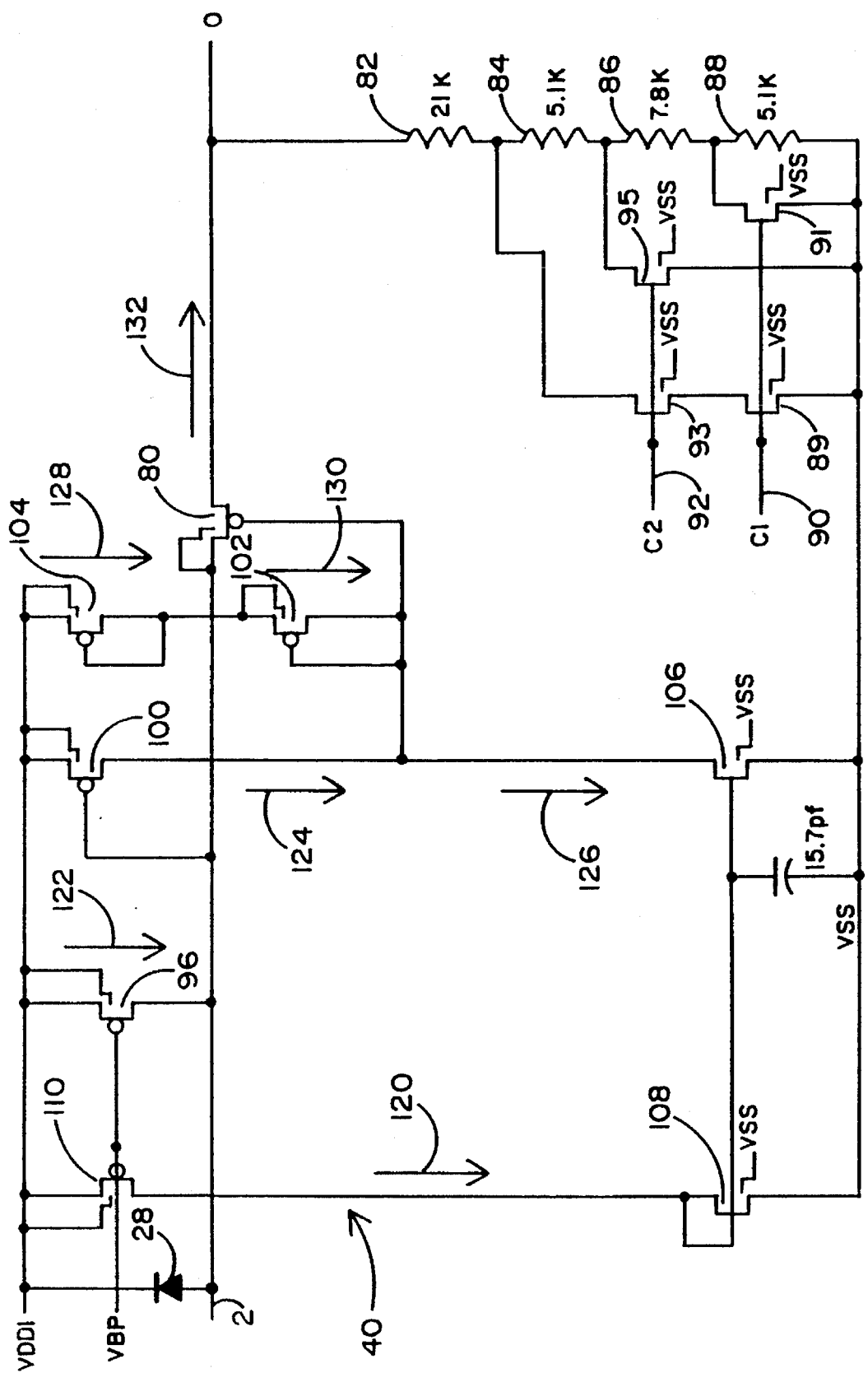
FIG. 3 shows schematically the components of the input amplifier of the SIR receiver.

FIG. 3 is a schematic showing the details of amplifier 40, a transimpedance amplifier used to convert the detector current input to a voltage output at 44, as shown in the diagram. There are several design parameters that relate to this amplifier:

1. Input impedance is below 20 kOhms, in order to maintain a signal bandwidth of 116 kHz, with a 70pF detector capacitance.

2. A wide pulse current dynamic range extends from 100 nA to 80 mA, and the quiescent current range extends from 0 to 30 µA.

3. Low input referred noise current of 4 nA is required to meet the bit error rate requirements.

Following the schematic diagram, the amplifier circuit operation is described. Mosfet transistor 80 and the series combination of resistors 82, 84, 86 and 88 form a common gate amplifier. Control inputs 90 and 92 control mosfet switches 89, 91, 93 and 95, which are used to trim the series combination of resistors, in order to compensate for process variations. VBP comes from a reference current mirror and biases a mosfet transistor 96 as a 263 nA quiescent current source into the mosfet transistor 80. Without this source, the input transistor 80 would have to meet all design requirements with currents as low as 100 nA. The channel thermal noise at 100 nA would not meet the design requirements. The transconductance of transistor 80 is also too low to meet the desired 20 kOhm input impedance at low quiescent currents.

Feedback from the source to the gate of transistor 80 is used to reduce the input impedance at low quiescent current operating conditions. The feedback amplifier combines an input transistor 100 and a load consisting of the series combination of transistors 102 and 104. The combination of transistors 106, 108 and 110, and capacitor 90, form a current source to bias the feedback amplifier.

The gate-to-source voltage (Vgs) values at the transistors 80, 100, 102 and 104 need to be interrelated in such a way as to cause proper functioning of the transimpedance input amplifier 40. The amplifier, as stated above, converts photodetector current into an output voltage. The amplifier must present a low impedance to the detector, in order to increase the detector bandwidth, because the bandwidth decreases as the amplifier impedance increases, and vice versa.

If the design of amplifier 40 were conventional, transistors 100, 102, 104, 106, 108 and 110 would form a high gain amplifier, having a relatively narrow bandwidth. Because the wireless IR system requires a bandwidth of about 200 KHz, the input amplifier impedance must be reduced to about 16 Kohms, or less.

The present invention provides means for enhancing the bandwidth, without sacrificing the low power goals, and with a minimum number of additional transistors. The gain of the amplifier is a controlled value of approximately 10, in order to meet the low input impedance of 16 Kohms, without using high current or power.

Reverse bias of detector 28 is achieved with transistors 102 and 104, and transistors 80 and 100 ratios. Also, as stated above, transistor 96 provides a bias current source, which keeps transistor 80 turned on more than normal, at very low detector currents, thereby achieving the desired bandwidth. In other words, the detector is not required to supply all the current.

The loop gain of the amplifier has been made independent of signal level by the addition of transistors 102 and 104, and by setting the transistor ratios so that, at low input currents, Vgs of transistor 104 plus Vgs of transistor 102 equals Vgs of transistor 80 plus Vgs of transistor 100.

The width-to-length ratios of the transistors in FIG. 3 are as follows: transistor 80 is 74.4/1.2 microns, transistor 96 is 10.2/10.2 microns; transistor 100 is 30.0/1.8 microns; transistor 102 is 10.8/1.8 microns; transistor 104 is 198.0/1.2 microns; transistor 106 is 49.2/10.2 microns; transistor 108 is 12.6/10.2 microns; and transistor 110 is 10.2/10.2 microns.

Because of the emphasis on low current and thus low power, all current values are set forth, by referring to arrows shown in the drawing; at arrow 120, 266 nA; at arrow 122, 263.5 nA; at arrow 124, 558 nA; at arrow 126, 623 nA; at arrow 128, 64.9 nA; at arrow 130, 65 nA; and at arrow 132, 276.5 nA. The total current in amplifier 40 is approximately 1.1 µk, a very low value.

The transistors 89, 91, 93 and 95 operate as switches, controlled by inputs 90 and 92. These inputs are 5 to 0 volts, or 3 to 0 volts. The transistor switches are set in manufacturing; they select which of the resistors 82, 84, 86 and 88 are inserted in the path between the output and ground (VSS). These transistors dissipate no power because the voltage across them is near or at zero.

The input amplifier 40 is designed to meet the design requirements at detector currents up to about 30 µA. Above this level, noise performance and linear operation is not critical because the signal level is large. The values of resistors 82, 84, 86 and 88 have been selected to give a linear operating range of about 30 µA without degrading the noise performance of the circuit.

Simplifying the amplification in the gate-to-source path of transistor 80 is a primary source of power savings in this circuitry. Usually full operational amplifiers with many more transistors, and bias paths with voltage reference generators, are used for this function. Even with the simplified amplification, the quiescent current in transistor 106 must be carefully designed to provide the desired bandwidth with low noise. The current in transistor 96, which sets the minimum quiescent current in transistor 80, was made as low as possible while maintaining stable operation, thus preventing circuit oscillations. The load resistance was made as large as possible without degrading noise performance, thereby reducing the requirement for greater signal gain in the subsequent stages. Transistors 80, 100, 102, 104, 106 and 108 are operating in the sub-threshold region, thereby contributing to low power operation of the receiver.

Another feature of amplifier 40 is that, at low detector current, the gain of the amplifier is at its peak value; but when the detector current increases, the ratio of currents through transistors 100 and 102 tends to decrease the amplifier gain, accompanied by decreasing input impedance. The net result is that the bandwidth tends to stay essentially constant, independently of input current. This has two benefits. First, the noise bandwidth of the input is constant, providing better signal-to-noise performance. Second, the amplifier is in a feedback loop around transistor 80, which is stable with constant loop gain.

Figure 4:
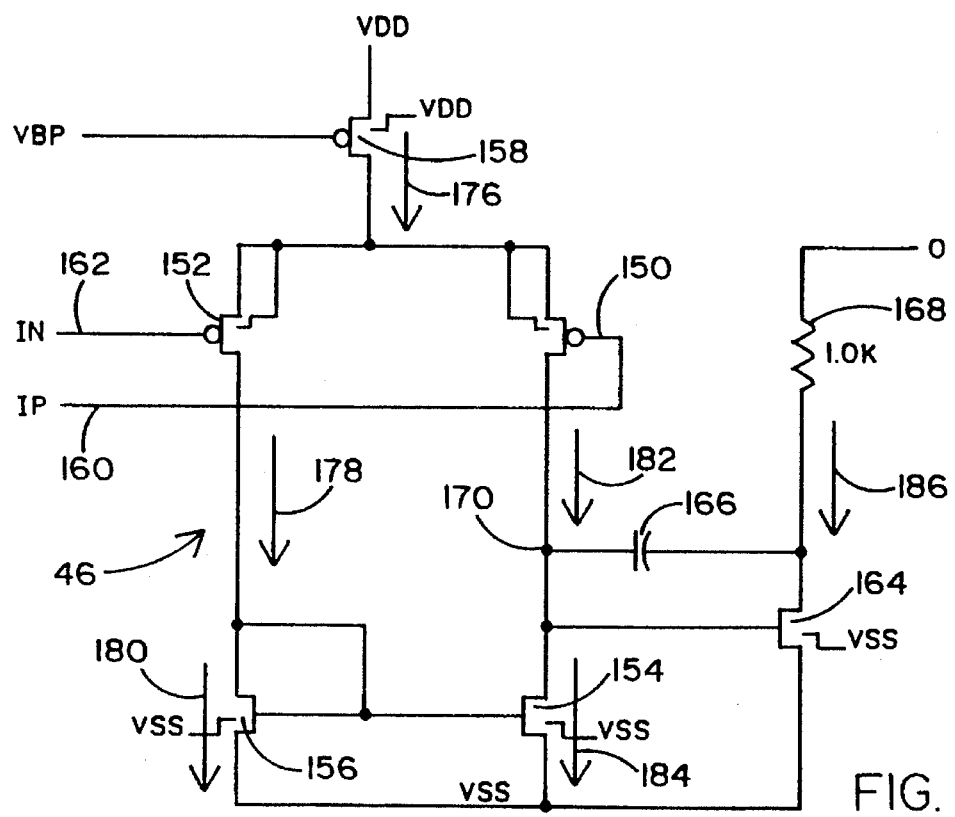
FIG. 4 shows schematically the details of the clamp circuit, which prevents saturation of the input amplifier.

FIG. 4 shows schematically the details of the clamp circuit 46, which essentially prevents saturation. At large AC signal levels amplifier 40 would saturate, requiring long recovery times, which would severely degrade signal bandwidth performance. Clamp circuit 46 is arranged to sense the signal level at the output 44 of amplifier 40, and to divert excess current from the detector input to VSS if the output at 44 is above a certain predetermined value, in this case about 1 Volt. Therefore the input amplifier 40 stays in a linear operating region, and signal bandwidth is maintained.

In the clamp circuit 46, transistors 150, 152, 154, 156 and 158 form a differential amplifier input stage. A positive input line 160 is connected to the gate of transistor 150; and a negative input line 162 is connected to the gate of transistor 152. A reference voltage of about 1 volt is maintained on line 160, and at transistor 150. The output of amplifier 40 is connected to line 162 and to transistor 152. The voltage level at transistor 150 is selected to avoid amplifier saturation.

The output stage of the clamp circuit has an open drain transistor 164, and a compensation capacitor 166. A resistor 168 is a current limiting resistor in series with open drain transistor 164.

When the output from amplifier 40 on line 162 is less than the reference voltage on line 160, node 170 is low, and transistor 164 is off. In this condition, the clamp circuit does not drain any current from the detector input signal. When the voltage level at transistor 152 equals the reference level at transistor 150, drain transistor 164 turns on, thereby maintaining the level of current going into amplifier 40. This selected current level is about 30 µA, which will avoid saturation of amplifier 40. The clamp circuit 46 is operating in a linear region around amplifier 40, and compensation is provided by capacitor 166, in order to maintain circuit stability.

By avoiding saturation of the amplifier, turn around time in the system is eliminated. Avoiding saturation is particularly important at amplifier 40. It is also important at subsequent components of the receiver, e.e., amplifier 48, and comparator 54.

When currents from the detector are higher than about 3 mA, the clamp circuit can no longer drain current from the detector, and the detector becomes its own clamp diode when it forward biases itself. The clamp circuit will still cause the circuitry to recover from these over loads, because it actively drains current from the detector, unlike RC passive circuits.

The power consumed by the clamp circuit has been minimized by careful circuit design with respect to amplifier gain and bandwidth. When the clamp circuit starts to activate, it is part of the feedback circuit around the amplifier, and therefore gain stability is an important design consideration. Excess gain and bandwidth would make the design very stable at the expense of more current. The input stage to the clamp circuit operates in the subthreshold region, with just enough transconductance to drive the compensation capacitor 166 and transistor 164. The whole clamp circuit consumes about 269 nA, or 1.35 µW, when the clamp is not activated.

The width-to-length ratios of the clamp circuit transistors are: transistors 150 and 152, each 50.4/6.0 microns; transistors 154 and 156, each 50.4/10.2 microns; transistor 158, 10.2/10.2 microns; and transistor 164, 199.2/1.2 microns.

The approximate current levels at "idling" are as follows: at each of arrows 176, 178 and 180, the current is 269 nA; at arrow 182, O; at arrow 184, 29 pA; and at arrow 186, 0.4 pA.

In clamp circuit 46, excess current is drained at the input of amplifier 40. The signal could be limited at the output of the amplifier, but the arrangement shown is considered preferable. The fact that pulsed signals are being transmitted makes the clamping more effective. The clamping effect acts instantaneously on each individual pulse. In other words, the clamping circuit monitors the signal continuously, and makes an instantaneous decision whether to divert excess current.

The clamping circuit 46, and the clamps applied to amplifier 48 and comparator 54, constitute means for avoiding saturation. They control the absolute signal levels in order to guarantee that the amplifiers do not saturate. This can be accomplished either at the inputs of the amplifiers or at the outputs of the amplifiers.

If higher power levels were being used, clamping would be easier. In the present invention, clamping is more effective because current is shunted before it reaches the amplifier. Above the selected value of 30 µA, the system goes into a non-linear range of operation.

Figure 5:
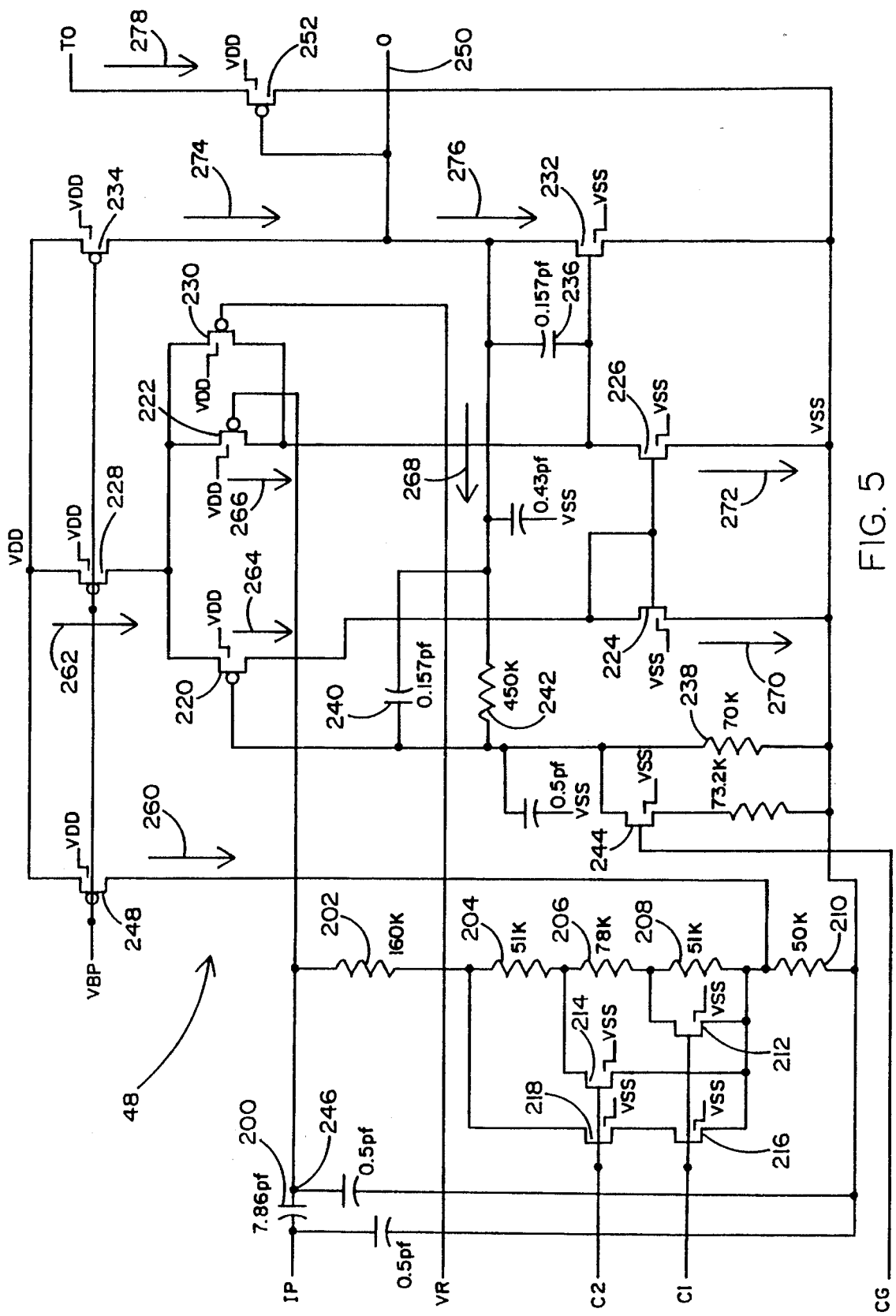
FIG. 5 shows schematically the details of amplifier 48.

FIG. 5 shows schematically the details of amplifier 48, which receives as its input signal the output signal from amplifier 40 on line 44. The output from amplifier 40 must be filtered and amplified in order to be detected reliably. Amplifier 48 functions as a bandpass filter as well as an amplifier. The signal on line 44 is input to amplifier 49 at the IP pin into a high pass RC filter, comprising capacitor 200, and resistors 202,204,206, 208 and 210. Mosfet transistor switches 212,214, 216 and 218, which are controlled by C1 and C2 inputs, are used to compensate the resistance for process variations. The input stage of the differential amplifier comprises mosfet transistors 220, 222, 224, 226 and 228. Transistor 230 is turned off during normal operation.

The output stage of the amplifier comprises a gain transistor 232 and a current source 234, with a compensation capacitor 236. The gain of the amplifier is set by a feedback network, comprising resistor 238, capacitor 240, and resistor 242. The feedback was configured with resistor 238 connected to VSS, so that a signal ground and associated components were not required. VSS is also a low noise node. The gain of the amplifier can be programmed higher by turning on transistor 244, which lowers the input resistance of the feedback network.

The DC bias of the amplifier input at node 246 is set by a current source transistor 248 through resistor 210. The output offset of the amplifier is the DC gain of the amplifier times the input voltage. Power was conserved in this amplifier by running low current in the output stage. The output stage quiescent current primarily drives resistor 242 to the DC operating point. The current is just large enough to get a detectable signal at the output 250. Larger signals would saturate the amplifier, so resulting signals are clipped by the amplifier. Transistor 252 is a source follower used for testing purposes. The output 250 goes to the comparator circuit for detection.

Many design tradeoffs have been made to reduce amplifier 48 power. The input filter is a passive RC high pass stage. Greater filtering could have been achieved using a multistage active filter. Power considerations prohibited such a filter. The reference voltage to the resistive feedback network around the amplifier is referenced to ground. Typically a low impedance voltage reference would be generated, incurring a higher circuit current. The output DC level is raised above ground by biasing the positive input of the amplifier to about 10 mV. This is accomplished by running a small current (192 nA) from transistor 248 through resistor 210; and the resulting DC output level at 250 is 157 mV. The current source 234 of the output stage only sources 2.1 µA. This gives a maximum output drive voltage of about one volt, which is much less than the full supply output range of typical amplifiers. This also results in signal clipping at low input levels, due to this amplifier saturating. This clipping effect resulted in special requirements in connecting this amplifier to the comparator circuit. Additionally the amplifier itself is a low current design that just meets the input noise and gain-bandwidth requirements. The transistors operating in the subthreshold region are 220, 222,224 and 226, which are the input stage of the amplifier.

Amplifier 48 has a built-in clamping feature, which limits the signal, in order to prevent saturation. Transistor 230, which is normally turned off, causes shunting of excess voltage when the signals tend to become too large, thereby keeping the output signal swings low, i.e., less than 1 volt. Restating this point, the transistor 230 acts as a voltage clamping transistor, so that, if input signals exceed a predetermined voltage, the output swing is minimized, thereby minimizing power dissipation, preserving gain bandwidth, and preventing saturation.

The width-to-length ratios of the amplifier 48 transistors are: transistors 212, 214, 216 and 218, each 3.6/1.2 microns, transistors 220 and 222, each 50.4/2.4 microns; transistors 224 and 226, each 25.2/3.6 microns; transistor 228, 16.2/ 10.2 microns; transistor 230, 45.0/2.4 microns; transistor 232, 201.6/1.8 microns; transistor 234, 20.4/10.2 microns; transistor 244, 10.2/1.2 microns; transistor 248, 9.0/10.2 microns; and transistor 252, 99.6/1.2 microns.

The approximate current levels at "idling" are as follows: at arrow 260, the current is 192 nA; at arrow 262, 717 nA; at each of arrows 264 and 266, 359 nA; at arrow 268, 309 nA; at each of arrows 270 and 272, 359 nA; at arrow 274, 2.14 µA; at arrow 276, 1.83 µA; and at arrow 278, 0. The total quiescent current in amplifier 48 is approximately 3 µA.

Figure 6:
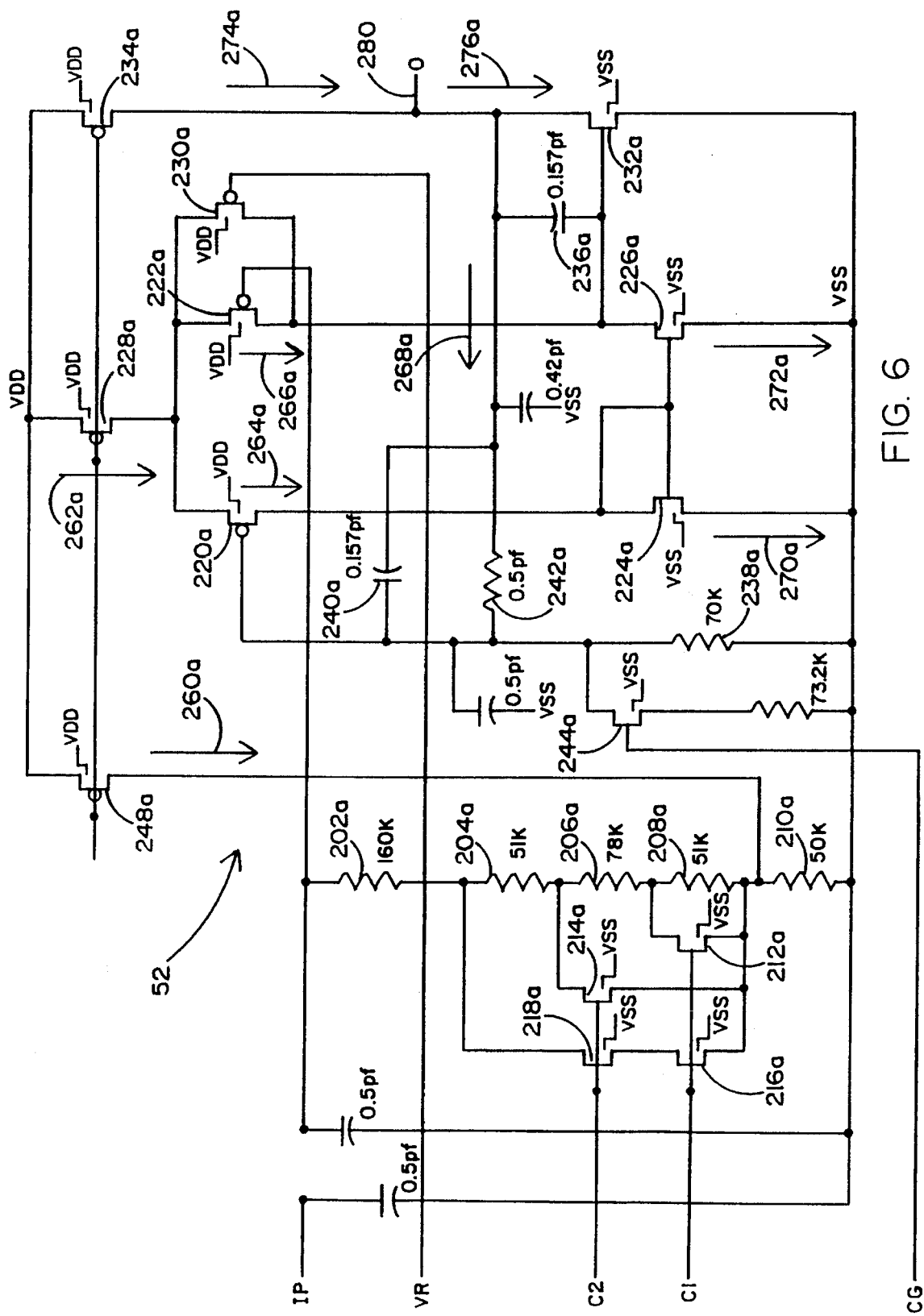
FIG. 6 shows the circuitry details of amplifier 52.

FIG. 6 is a schematic showing the details of amplifier 52, which is used as a DC offset compensation circuit. Amplifier 52 is identical to amplifier 48, but has no AC input. Therefore the DC level at its output 280 will be identical to that of amplifier 48 when there is no AC signal present. The comparator 54 will subtract the output level of amplifier 52 from the output level of amplifier 48, giving a zero referenced AC signal into the comparator. The circuit description of amplifier 52 is identical to that of the amplifier 48. Numerals in FIG. 6 are the same as the numerals in FIG. 5, except that the letter "a" has been added to each numeral.

The current-saving features of this amplifier 52 circuit are the same as those of the amplifier 48 circuit. The current values at each arrow are the same, except for those at arrow 274*a*, which is 1.1 µA; and at 276*a*, which is 1.0 µA. The total quiescent current in amplifier 52 is approximately 2 µA.

Figure 7:
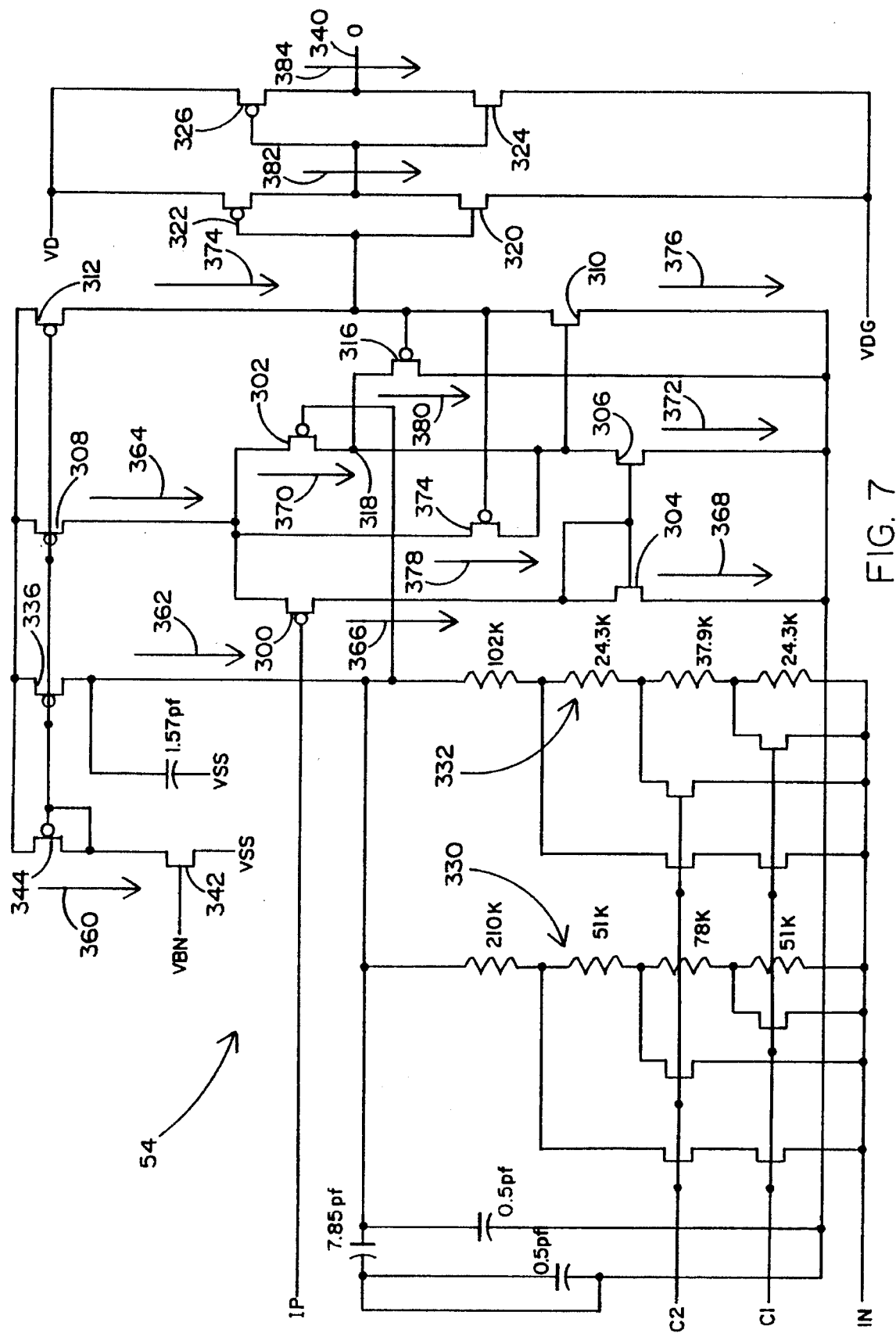
FIG. 7 shows the circuitry details of comparator 54.

FIG. 7 is a schematic showing the details of comparator 54. A differential input stage comprises transistors 300, 302, 304, 306 and 308. The second stage of the comparator, comprising transistors 310, 312 and 314, gives the comparator some hysteresis. Transistor 316 acts to clamp node 318 for fast recovery from saturation. Transistors 320, 322, 324 and 326 form two CMOS inverting buffers, which are powered from the digital supplies VD and VDG for noise isolation. The IN input comes from the DC compensation circuit amplifier 52. The parallel resistor networks 330 and 332 connect IN to comparator input device 302. A detection threshold is generated by running a current through the resistor network from a current mirrored transistor 336.

The positive input IP to the comparator into transistor 300 comes from the output of amplifier 48. When the voltage at IP is greater than the detection threshold, the comparator will switch, and the output 340 will go low (340 is an inverted output, if IP is considered a positive output). Transistors 342 and 344 are a current mirror bias circuit that isolates the bias current from the amplifier bias circuits.

The transistors in the input stage of the comparator, i.e., transistors 300, 302, 304 and 306, are operating at minimal current levels in the subthreshold region, in order to conserve power. With no signal present, transistor 310 is off, which reduces the output stage current to zero. Low power CMOS inverter stages buffer the digital output signal.

The transistor width-to-length ratios are: transistors 300 and 302, each 50.4/1.8 microns; transistors 304 and 306, each 25.2/3.6 microns; transistor 308, 16.2/10.2 microns; transistor 310, 50.4/1.2 microns; transistor 312, 16.2/10.2 microns; transistor 314, 6.0/1.8 microns; transistor 316, 7.2/1.2 microns; transistor 320, 6.0/1.2 microns; transistor 322, 10.2/1.2 microns; transistor 324, 12.0/1.2 microns; transistor 326, 20.4/1.2 microns; transistor 336, 10.2/10.2 microns; transistor 342, 12.0/10.2 microns; and transistor 344, 10.2/10.2 microns.

The approximate current levels at "idling" are as follows: at arrow 360, the current is 265 nA; at arrow 362, 286 nA; at arrow 364, 1.42 µA; at each of arrows 366 and 368, 850 nA; at each of arrows 370 and 372, 573 nA; at arrow 374, 3.4 pA; at arrow 376, 0.3 nA; and at arrows 378, 380, 382 and 384, 0. the total quiescent current in comparator 54 is approximately 1.94 µA. The question of quiescent current does not apply to the digital output signals, which only occur when transmitter signals are coming to the receiver.

Figure 8:
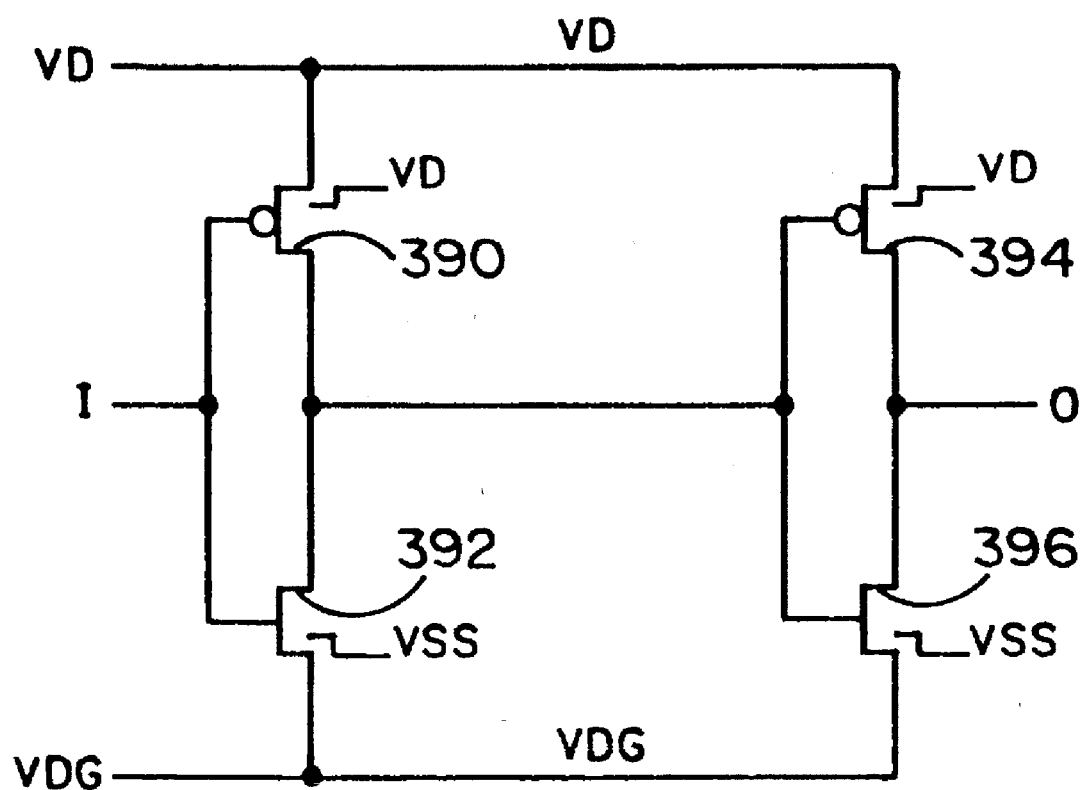
FIG. 8 shows the circuitry details of output buffer 58.

FIG. 8 shows the circuitry of output buffer 58, which provides a CMOS driver to the output 56 of the receiver. This circuit consists of two CMOS inverters, which comprise transistors 390, 392, 394 and 396. No power is consumed when no transmitter signal is present.

Figure 9:
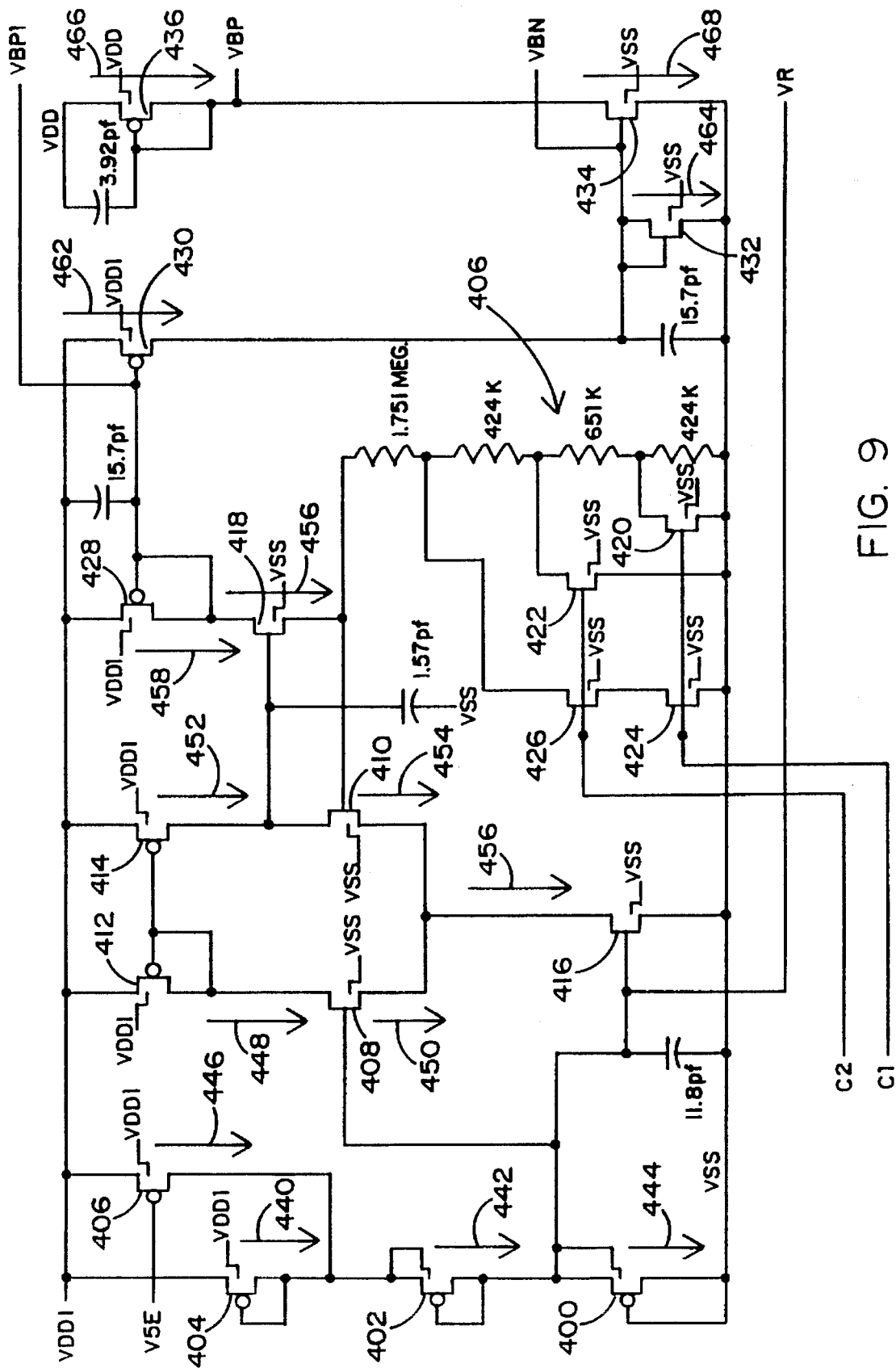
FIG. 9 shows the circuitry details of bias block 60.

FIG. 9 shows the circuitry of block 60. The bias circuitry distributes required bias currents and reference voltages to all other circuit blocks. The bias circuit features an operating voltage select pin V5E. This pin allows the current to operate in low current conditions at VDD equal to 5 Volts or 3 Volts.

Transistors 400, 402 and 404 form a voltage divider with VR at VDD/2 when V5E is low and VDD/3 when V5E is high. Cl is a filter to reduce noise on VR. VR is placed across a resistor network 406 by a voltage follower amplifier, comprising transistors 408, 410, 412, 414, 416 and 418. The resistor network can be trimmed with MOS switch devices 420, 422, 424 and 426, which are controlled by C1 and C2, in order to compensate for process variations. The current through the resistor network 406 flows through transistor 418 to a current mirror comprising transistors 428 and 430. The gate voltage on transistor 428 also drives a current mirrored device in amplifier 40. The current from transistor 430 goes to another current mirror, i.e., transistors 432 and 434. The gate voltage of transistor 432 also drives a current mirror in the comparator 54 circuit. The current from transistor 434 goes to another current mirror, transistor 46, whose gate voltage drives current mirrors in the amplifier 52 and amplifier 48 circuits. All capacitors in this circuit filter supply and circuit noise.

Power is minimized in the bias circuit by using small currents in the reference mirrors. The input transistors 408 and 410 operate in the subthreshold region. The current-setting resistor is also made large to reduce power. V5E supply select also adjusts the bias currents to keep them low when the supply voltage is raised from 3 to 5 volt operation.

A unique benefit of the present bias circuitry is its ability to maintain nearly constant current values over a wide range of voltages. Normally lowering voltage would require increasing current; but that problem has been avoided. The present design protects against loss of bandwidth.

The transistor width-to-length ratios are: transistors 400, 402 and 404, each 8.4/81.6 microns; transistors 408 and 410, each 25.2/2.4 microns; transistors 412 and 414, each 20.4/10.2 microns; transistor 416, 4.2/210.0 microns; transistor 418, 100.8/1.2 microns; transistors 420, 422,424 and 426, each 3.6/1.2 microns; transistors 428 and 430, each 10.2/10.2 microns; transistors 432 and 434, each 12.6/10.2 microns; and transistor 436, 10.2/10.2 microns.

The approximate current levels are as follows: at arrow 440, 0; at each of arrows 442, 444 and 446, 210 nA; at each of arrows 448, 450, 452 and 454, 160 nA; at arrow 456, 320 nA; at each of arrows 458 and 460, 528 nA; at each of arrows 462 and 464, 266 nA; and at each of arrows 466 and 468, 277 nA. The total current in block 60 is approximately 1.6 µA.

The low power aspects of the disclosed receiver have been discussed in detail. Adding all of the currents in the receiver, as they function in the "idling" or quiescent, state, the total is about 11 microamps. When operating at 5V, the power is about 55 microwatts; and when operating at 3V, the power is about 33 microwatts.

The 11 µA current is almost two orders of magnitude below that of receivers presently available. This makes it feasible to maintain the receiver ready to receive transmitter signals, whenever they occur. In the introductory discussion, the value of 100 µA was used as a quantified upper limit of current which permits that receiver readiness. The figure of 100 µA is admittedly arbitrary; but it is doubtful that a higher current value would permit the combination of battery operation and receiver readiness.

As stated above, the present receiver succeeds in obtaining radical current reduction, while maintaining sufficient bandwidth, and noise rejection.

The presence of the clamping circuitry, primarily at the input amplifier, but also at the bandpass filtering amplifier and at the comparator, provides a tremendous benefit in operating speed, e.g., an improvement of almost 1,000 times over prior devices.

The present receiver minimizes the voltage swings in the "analog" portion of its operation. Individual voltage swings are in microvolts or millivolts. The low voltage swings are important at distances greater than 1 to 2 feet between transmitter and receiver.

The combination of matched amplifiers 48 and 54 constitutes an unusually rigorous arrangement which cancels the non-ideal characteristics of amplifier 48. This provides means for accomplishing threshold normalization in the comparator, maintaining a fixed tracking of DC offsets between the two inputs of the comparator.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concept explained herein with the maximum breadth and comprehensiveness permitted by the prior art.

What is claimed is:

1. In a wireless infrared pulse-transmitting apparatus having a transmitter, a receiver comprising:

a photodetector which receives input pulses from the transmitter;

an input amplifier which receives current signals from the detector and outputs voltage signals;

active clamping circuitry which prevents signal saturation at the input amplifier regardless of the incoming signal strength, by monitoring continuously the signal amplitude at the input amplifier and diverting all excess current therefrom once a preselected signal amplitude at the input amplifier is reached, in order to avoid loss of signal transmission time;

a second amplifier which receives its input signals as pulses from the input amplifier, and outputs pulsed signals; and a comparator which receives the amplified signals, and outputs digital information.

2. The apparatus of claim 1 in which the clamping circuitry is an active current drain which has no effect on the bandwidth of the input signals.

3. The apparatus of claim 1 in which the clamping circuitry limits the incoming signal by diverting excess current from the detector before it enters the input amplifier.

4. The apparatus of claim 3 in which the clamping circuit is controlled by the output voltage of the input amplifier, and shunts the current entering the input amplifier when the output voltage reaches a predetermined value.

5. The apparatus of claim 1 in which the clamping circuitry acts immediately on each individual input pulse.

6. The apparatus of claim 1 in which the clamping circuitry constitutes feedback circuitry around the input amplifier.

7. The apparatus of claim 1 in which the clamping circuitry maintains as an upper limit the preselected current level and maintains the signal bandwidth at the input amplifier.

8. The apparatus of claim 1 which also includes:

means for enhancing bandwidth at the input amplifier by supplying bias current to add to the detector-supplied current during relatively long-distance information transmissions.

9. For use in a wireless infrared pulse-transmitting apparatus having a transmitter:

photo detector which receives input pulses from the transmitter;

a low power consuming receiver which is kept in a turned on mode to be continuously ready for input from the transmitter;

said receiver including as components (a) an input amplifier which receives current signals from the detector and outputs voltage signals; (b) means for preventing signal saturation at the input amplifier; (c) a second amplifier which receives its input signals as pulses from the input amplifier and outputs pulsed signals; and (d) a comparator which receives signals which have been output by the second amplifier, and outputs digital information;

said receiver components incorporating mosfet transistors, a substantial number of which are operating in the sub-threshold region.

10. The apparatus of claim 9 in which the total current in the receiver as it awaits signals from the transmitter is no greater than 100 microamps.

11. In a wireless infrared pulse-transmitting apparatus having a transmitter and a photodetector which receives infrared pulses from the transmitter, an integrated circuit (IC) receiver chip which contains:

an input amplifier which receives varying amplitude current signals from the photodetector;

a clamping circuit which cuts off the current coming from the photodetector at a preselected amplitude, by shunting excess current before it reaches the input amplifier; and means for converting output signals from the input amplifier into digital signals representing the transmitter message.

12. In a wireless infrared pulse-transmitting apparatus having two receiver/transmitter combinations in which the receiver in each combination receives signals from the transmitter in the other combination, and is subject to possible signal saturation from either of the two transmitters, a receiver comprising:

a photodetector which receives pulses from transmitter, and emits current signals;

an input amplifier which receives current signals from the photodetector and outputs voltage signals as pulses;

clamping circuitry which responds to signal amplitude to cut off the input current into the input amplifier in order to prevent saturation of the amplifier; and a comparator which converts output signals from the input amplifier into digital signals representing the transmitter message.

* * * * *